June 25, 1957   P. A. MÜLLER   2,796,810
MACHINERY FOR PRODUCING FILTER STRANDS FROM FIBROUS PULP
Filed July 6, 1953   10 Sheets-Sheet 4

Inventor:
Paul Adolf Müller

June 25, 1957 P. A. MÜLLER 2,796,810
MACHINERY FOR PRODUCING FILTER STRANDS FROM FIBROUS PULP
Filed July 6, 1953 10 Sheets-Sheet 8

Fig. 24

Inventor:-
Paul Adolf Müller

June 25, 1957  P. A. MÜLLER  2,796,810
MACHINERY FOR PRODUCING FILTER STRANDS FROM FIBROUS PULP
Filed July 6, 1953  10 Sheets-Sheet 9

Fig. 25

Inventor:
Paul Adolf Müller

June 25, 1957 P. A. MÜLLER 2,796,810
MACHINERY FOR PRODUCING FILTER STRANDS FROM FIBROUS PULP
Filed July 6, 1953 10 Sheets-Sheet 10

United States Patent Office 2,796,810
Patented June 25, 1957

2,796,810

MACHINERY FOR PRODUCING FILTER STRANDS FROM FIBROUS PULP

Paul Adolf Müller, Herrliberg, Zurich, Switzerland

Application July 6, 1953, Serial No. 366,316

Claims priority, application Switzerland September 9, 1952

22 Claims. (Cl. 92—39)

The invention relates to the manufacture of fibrous filters applicable, for instance, as smoke filters for tobacco goods.

It is an object of my invention to devise a method and machinery for the mass production of filter products that combines low manufacturing cost with better filtering qualities than heretofore obtainable in low-cost filter bodies.

To this end, I produce the filters from a watery fiber pulp by first pouring and pre-shaping the pulp into a coherent strand with simultaneous expulsion of water, and thereafter subject the moist strand to further expulsion of water under application of molding pressure.

According to another feature of my invention, I discharge the wet fibrous pulp from a supply tank into the range of a water-permeable conveyor which envelops the pulp and shapes it into a strand while draining water from the pulp material.

These and other features as well as various specific objects and advantages will be apparent from, and will be referred to in, the following description of the examples illustrated on the drawing.

Figure 1:
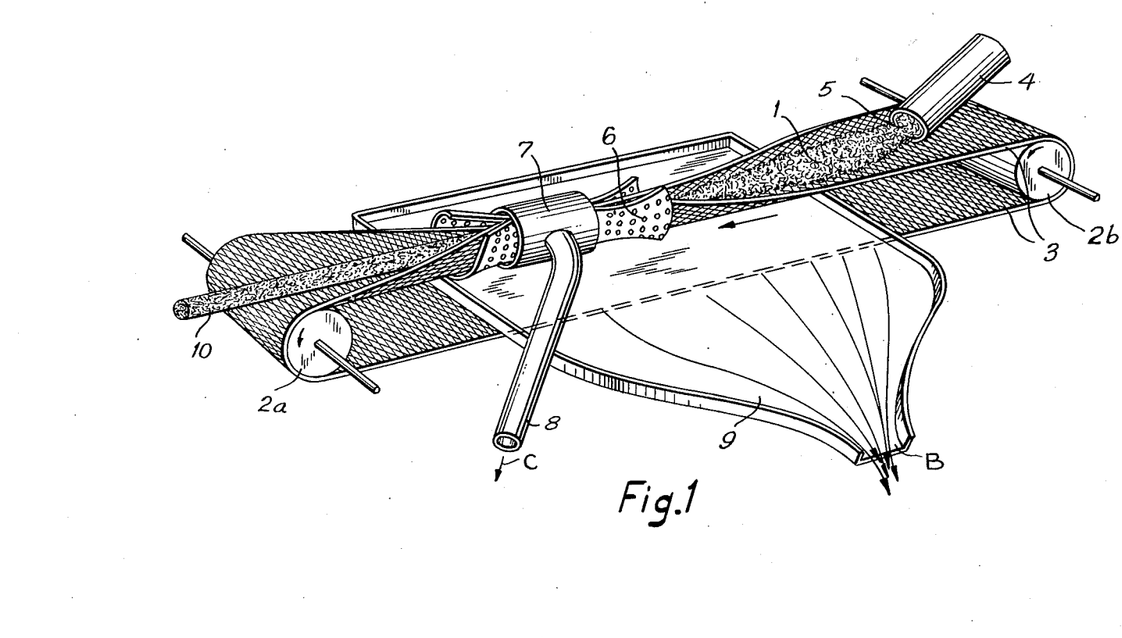
Fig. 1 is a schematical and perspective view of a casting and a pre-shaping device.

The casting and pre-shaping device illustrated in Fig. 1 has two conveyor rollers 2a and 2b surrounded by a water-permeable conveyor belt 3 which is driven by one or both of the rollers to travel in the direction indicated by an arrow. A feed pipe 4 supplies wet fiber pulp 1 from a tank (not illustrated). The pulp passes through the discharge opening 5 of pipe 4 onto the belt 3. Disposed along the travel path of the belt is a hollow cylindrical strainer 6 whose axial ends have a somewhat flaring shape. The strainer 6 is surrounded and held in position by a tube 7. Tube 7 is connected by a drain pipe 8 with a low pressure producer, for instance, a vacuum pump (not illustrated). A tray-shaped collector 9 is disposed between the two parts of conveyor belt 3 and beneath the strainer 6.

The device operates as follows. The wet fiber pulp flowing out of discharge opening 5 passes on belt 3 in the direction of arrow through the strainer 6. The belt 3 when passing through strainer 6 is deformed to a hollow cylindrical shape so that it envelops the pulp and presses it into cylindrical shape. At the same time, the pulp is partially dewatered by the pressure exerted upon it by the belt 3 within strainer 6 and also by the suction effective in tube 7. The expelled water flows partly through the perforations of strainer 6 onto the collector 9 from which it drains at B, and partly through the drain pipe 8 as indicated by the arrow C. The fibrous pulp emerges from strainer 6 as a coherent strand 10. Due to the permeability of the conveyor belt, the fibrous pulp loses part of its water through the belt while passing from the discharge opening 5 to the entrance of strainer 6, thus reaching the strainer 6 already in somewhat thickened condition. The fiber pulp poured and pre-shaped into the coherent strand 10 is subsequently subjected to molding and further expulsion of water as will be explained with reference to other illustrations.

Figure 2:
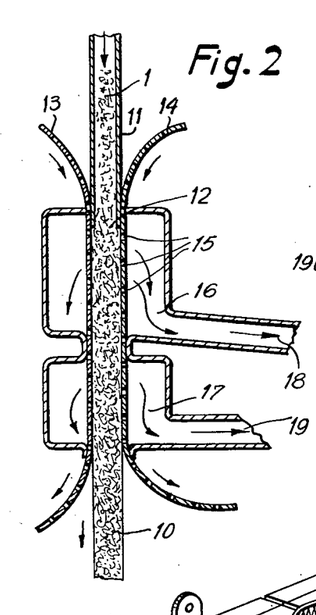
Fig. 2 is explanatory and shows schematically a modified embodiment of a pre-shaping device.

While in the embodiment according to Fig. 1, the pouring and pre-shaping of the fibrous strand occurs on a horizontal or only slightly inclined conveyor band, the strand may also be pre-shaped while travelling vertically downward. Fig. 2 shows the principle of such an arrangement and operation. The watery fiber pulp 1 is supplied from above through a feed pipe 11 whose discharge opening is located between two conveyor belts 13 and 14 of a shaping device. Both conveyor belts, moving downwardly as indicated by arrows, have perforations 15 so as to be permeable to water. The belts 13 and 14 are so shaped and arranged that they form together a cylindrical envelope about the pulp 1 within the range of the shaping device, as will be more fully described in a later place. The device 20 is equipped with a drain box 16 and a suction box 17. The drain box 16 receives the major portion of the water escaping through the perforations 15 immediately after the pulp 1 emerges from the discharge opening 12. This portion of the water content drains from box 16 through a pipe 18. The suction box 17 operates as an additional dewatering device and is connected by a suction pipe 19 with a source of vacuum (not illustrated). The vacuum in suction box 17 causes a further expulsion of the water which drains through pipe 19. Due to the further dewatering of the pulp and the simultaneously shaping of the pulp by the belts 13 and 14, the pulp is cast into cylindrical shape and emerges from the lower end of device 20 as a coherent strand 10. The cross section of strand 10 depends upon the enveloping shape of the conveyor belts 13 and 14.

Figures 3, 4:
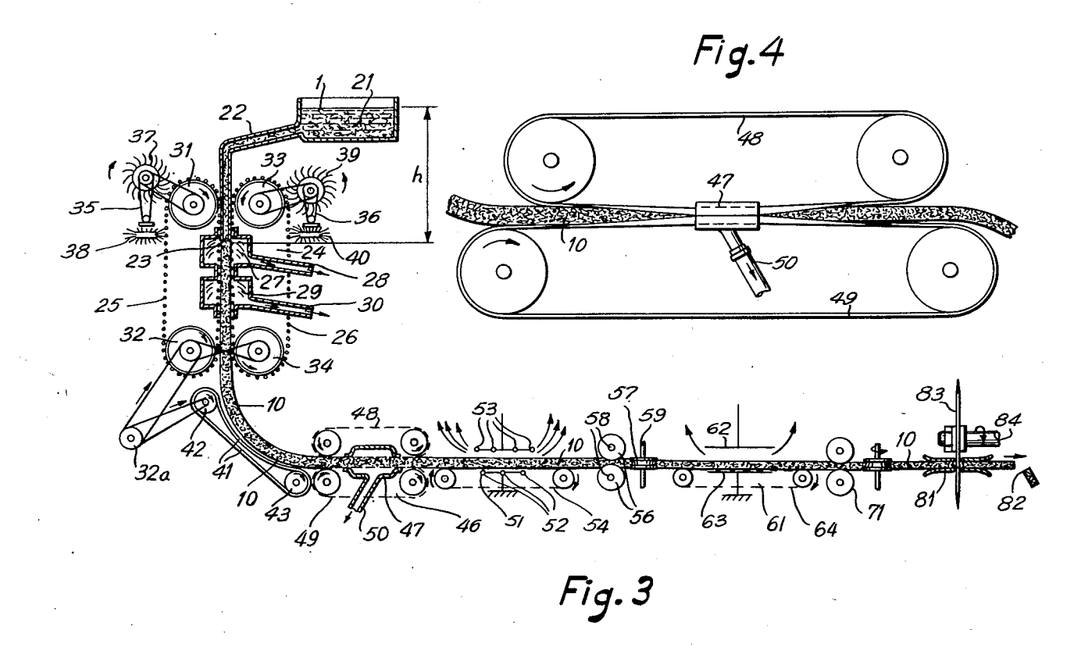
Fig. 3 is explanatory of the complete method and shows a schematic diagram of machinery including a pre-shaping device according to Fig. 2.
Figs. 4 to 12 illustrate details of the embodiment according to Fig. 3 on different scales of illustration.

Fig. 3 shows more in detail a complete embodiment involving the principle of Fig. 2. The wet fiber pulp 1 passes from a tank 21 through a feed pipe 22 whose discharge opening 23 lies near the top of a pre-shaping device. This device has a conveyor apparatus 24 with two water-permeable belts 25 and 26. The device further comprises a drain box 27 with a drain pipe 28 corresponding to the drain box 16 in Fig. 2, and also a suction box 29 whose suction pipe 30 is connected with a vacuum producer (not illustrated). The conveyor belts 25 and 26 are guided and driven by rollers 31, 32 and 33, 34 respectively. The belts 25, 26 jointly envelop a hollow cylindrical space within the range of the casting and molding operation, that is from the pulp discharge opening 23 down to the lower conveyor rollers 32 and 34. The rollers 32 and 34 are driven from a belt sheave 32a. The rollers 31 and 33 serve also for driving respective belt-cleaning devices 35 and 36 consisting essentially of rotating brushes 37, 38 and 39, 40 for eliminating any fibrous residue from the belts 25, 26.

Another conveyor belt 41, disposed beneath the pre-shaping device, is guided and driven by rollers 42 and 43 to pass the pre-shaped and coherent strand 10 to a molding device 46. Device 46 comprises a hollow cylindrical body 47 and water-permeable conveyor means 48, 49 which pass the strand 10 through the body 47. The hollow cylindrical body may be designed as a vacuum nozzle and has a pipe 50 for connection to a negative pressure producer.

From molding device 46, the strand 10 passes through an electric high-frequency dryer 51. The electrodes of one polarity are denoted by 52 and the electrodes of the other polarity by 53. The electrodes are so arranged that the field lines of the high-frequency drying field extend mainly longitudinally within the strand 10. This field direction is obtained by giving the electrodes an asymmetrical arrangement relative to the strand. The electrodes 52, 53 consist of rods extending parallel to each other in perpendicular relation to the longitudinal axis of the strand, the electrode rods of one pole being located between the rods of the other pole. In the drawing, the rods of electrodes 52 and 53 extend perpendicularly to the plane of illustration. A belt conveyor 54 passes the strand 10 through the dryer.

From dryer 51 the strand 10 passes through a first smoothing device. This device has two pairs of smoothing rollers 56 and 57 whose axes extend transverse to the strand-travelling direction and which are shaped to have their running surfaces surround the strand on all sides. The rollers are disposed in successive pairs and in such relative directions that the axes of one roller pair, for instance the two axes 58 of pair 56, are parallel to each other but are perpendicular to the revolving axes 59 of the other pair 57. While the drawing shows only two pairs of smoothing rollers, three or more such pairs may be provided depending upon the particular requirements.

Located behind the smoothing device 56, 57 is another drying device 61, also operating with high-frequency current. The electrodes of dryer 61 may be designed as mutually parallel plates 62, 63. However, they may also have a design similar to the electrodes of the above-described dryer 51.

The second drying device 61 is followed by a second smoothing device 71 which, in principle, has the same design as the first smoothing device 56, 57. Subsequently, a device 81 may be provided for cutting the fiber strand 10 into filter pieces 82 of the desired length. Such cutting devices are known and applicable in various modifications. For instance and as shown, a knife 85 mounted on the periphery of a disc 83 revolving about an axis 84 may be provided for cutting the strand 10 in a plane perpendicular to the travelling direction.

The operation of the machinery according to Fig. 3 is as follows. Due to the difference $h$ in elevation, the wet fiber pulp 1 drains from tank 21 through feed pipe 22 and enters at 23 into the cylindrical body formed at this place by the water-permeable conveyor belts 25 and 26 operated by the drive 32a. The pulp, enveloped and compressed by the conveyor belts, loses part of its water through the perforations or pores of the belt within the drain box 27. The fibrous mass, being retained between the two belts, is thus thickened so that the drainage is reduced or substantially clogged near and beyond the bottom opening of the drain box. The water expelled within the drain box 27 drains off through pipe 28. The fibrous pulp, now condensed and thickened, passes into the suction box 29 where a further amount of water is withdrawn from the densified pulp by the low air pressure in box 29. As a result, the coherence of the fibers is increased and the pulp leaves the bottom opening of the suction box as a roughly pre-shaped strand which, though still moist and plastic, is already coherent and fairly shape-retaining.

The strand then passes on conveyor belt 41 to the molding device 46. In this device, the strand is seized by the water-permeable conveyors 48, 49 and drawn through the hollow cylindrical body 47. This has the effect of compressing the strand by the correspondingly shaped conveyor belts to a smaller diameter while expelling a further amount of water. This water drains off through a pipe 50. The strand 10, thus molded, passes on conveyor 54 into the dryer 51 where the high-frequency field between electrodes 52 and 53 causes part of the residual moisture to evaporate from the strand. Subsequent to the first drying, the strand enters into the first smoothing device where it is given a smooth surface by the action of the rollers 56, 57. Thereafter, the strand 10 passes on conveyor 64 into the second drying device 61. While within dryer 51, the electric field lines extend substantially in the longitudinal direction of the strand, the field lines in drying device 61 traverse the strand substantially in a direction perpendicular to its travel. Subsequent to the second drying operation, the strand is again smoothed in the second smoothing device 71 and is calibrated by pressure to the desired final dimensions. Finally, the strand 10 passes along the cutting device 81 whose knife 85 severs the strand into pieces of the length required for the particular use or fabrication of the filters.

Figs. 4 to 10 illustrate details of the embodiment according to Fig. 3. Fig. 4 shows on a larger scale than Fig. 3 an especially favorable design of the molding device 46. As described, the strand 10 passes within device 46 on conveyor means 48, 49 through a hollow cylindrical body 47. The conveyor means 48 and 49 consist in this case of individual wire or string-shaped structures, preferably wire helices, which extend side by side and when passing through cylinder 47 are forced to conjointly assume a hollow cylindrical shape thus enveloping the strand 10 and pressing it into a corresponding shape.

Figure 5:
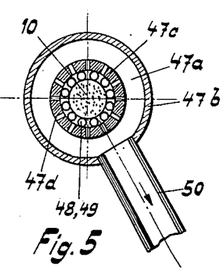
Figure 6:
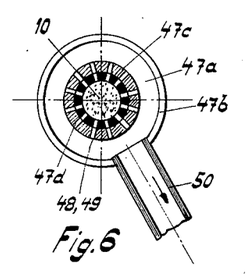

Figs. 5 and 6 show respective radial cross sections of different embodiments of the hollow cylindrical body 47 on a still larger scale. The hollow body, as shown in these figures, is designed as a vacuum nozzle. The low-pressure space 47a of the nozzle is surrounded by a housing 47b and is maintained at a negative pressure by means of a pump (not shown) connected to pipe 50. Disposed within the space 47a is the nozzle 47c with openings such as bores or slots 47d. The water-permeable conveyor means 48, 49 slide along the inner surface of the nozzle 47c and envelop the strand 10. In the embodiment according to Fig. 5, the conveyor means 48, 49 consist of wire helices similar to those of Fig. 4, while in the embodiment of Fig. 6 the conveyor means 48, 49 consist of a perforated sieve-like belt.

Figure 7:
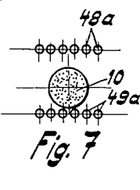
Figure 8:
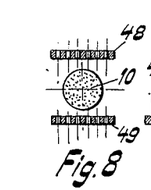
Figure 9:
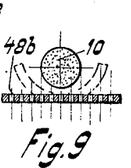

Figs. 7 to 9 show three modifications of the conveyor means 48, 49. According to Fig. 7, the conveyor means consist of individual wire or string-like structures 48a and 49a, for instance piano strings, wire ropes, wire helices. In the embodiment according to Fig. 8, the conveyor means consist of a perforated band, for instance a perforated rubber band. Fig. 9 shows how, instead of two or more conveyor belts or conveyor structures, only one belt 48b may serve as a conveyor means. Belt 48b has a sufficient width to be locally deformed by the hollow cylindrical body 47 into the substantially full-cylindrical shape required for enveloping the strand 10. In Figs. 7 to 9, the conveyor means are shown at a place remote from the hollow cylindrical body 47 where the conveyor means are substantially straight in their transverse direction.

Figure 10:
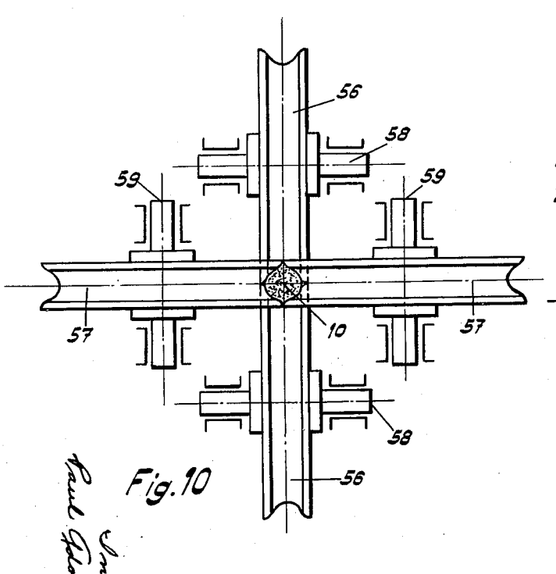

Fig. 10 illustrates a smoothing device as shown at 56, 57 or 71 in Fig. 3, the view in Fig. 10 being in the travelling direction of the strand 10. As explained, the two axes of each pair of rollers 56 or 57 are parallel to each other, while the axes 58 of one pair are perpendicular to the axes 59 of the other pair. The running and smoothing surfaces of the rollers are so shaped that the two rollers of each pair surround the fiber strand 10 to press and smooth it to the desired shape or surface condition. By changing the spacing between the two roller axes 58 of pair 56 and between the two axes 59 of pair 57, the cross section of the space enveloped by the smoothing roller faces can be varied, this space being traversed by the fiber strand so that the adjusted roller spacing determines the diameter of the cylindrical strand.

In machinery according to Fig. 3, including the details and modifications illustrated in Figs. 4 to 10, various accessories and improvements may be applied within the scope of the invention. For instance, it is usually desirable to provide the pre-shaping device with cleaning equipment 37 to 40 as already described with reference to Fig. 3. Another accessory device may serve to change the pressure of the fibrous pulp at the discharge opening 23 to thereby vary the degree of compression of the fiber pulp within the drain box 27 so that the texture of the strand assumes a greater or lesser density as may be desired. There are several possibilities of thus controlling and regulating the discharge pressure.

Figure 11:
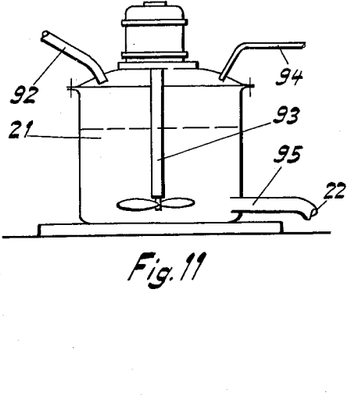

The first possibility consists in placing the pulp level in tank 21 under additional pressure. A device operating on this principle is shown in Fig. 11. The pulp tank 21 is designed as a pressure container to which the wet fiber pulp is supplied from a pump (not illustrated) through a supply pipe 92. A stirrer 93 serves to maintain the fibers in a uniform distribution within the water content of the pulp. The interior of tank 21 is kept above atmospheric pressure by compressed air supplied through a pressure pipe 94. The pressure forces the fibrous pulp through the feed pipe 22 so that a corresponding pressure is effective at the discharge opening 23 (see Fig. 3). By varying the pressure in tank 21 (Fig. 11), the pressure of the pulp at the discharge opening can be controlled or regulated as desired.

Figure 12:
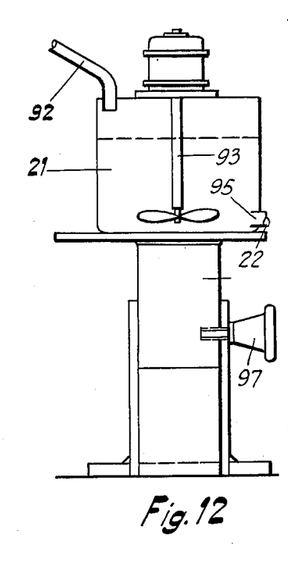

A second possibility of regulating the pressure of the pulp at discharge opening 23 consists in varying the pulp level in the pulp supply tank 21 or the elevation of the tank. This type of regulation is apparent from Fig. 12. The pulp supply tank 21 is mounted on a vertically displaceable support 96 that may be set to a desired level by means of an adjusting screw 97 so that the gradient $h$ (see Fig. 3) and hence the pressure of the pulp at the discharge opening 23 are varied. The pulp tank is equipped with a stirrer 93, a pipe 92 for the supply of the pulp, and an outlet pipe 95. Connected to pipe 95 is the feed pipe 22 which must be so designed that it may adapt itself to the adjustable elevation of the tank 21. To this end, for instance, the feed pipe 22 may consist at least partly of a flexible hose of sufficient length.

Figure 13:
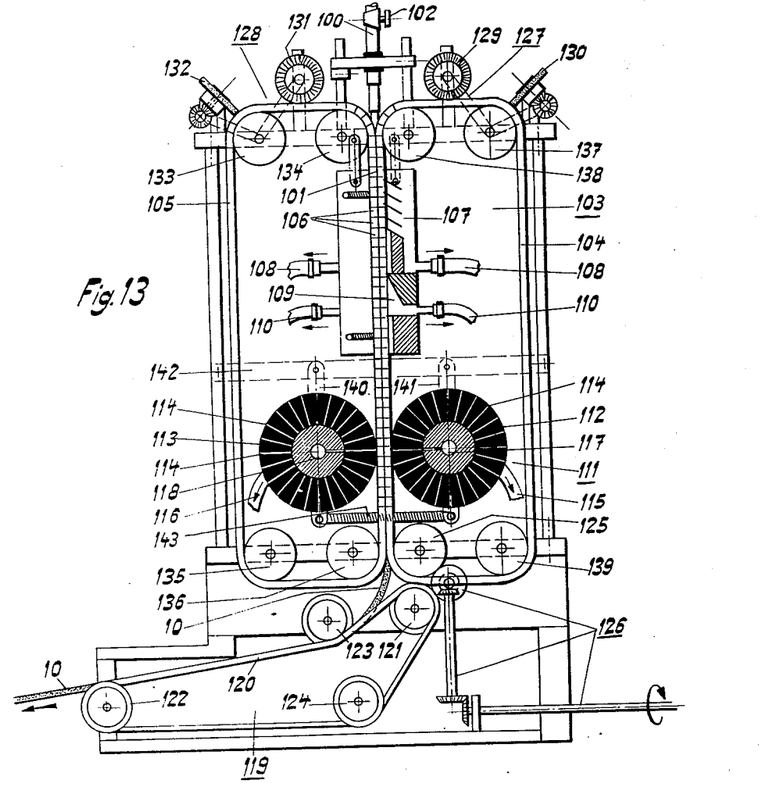
Fig. 13 is a more realistic and partly sectional illustration of an especially favorable design of a machine incorporating a device according to Fig. 2.
Figure 14:
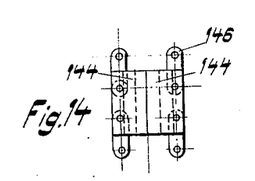
Figs. 14 to 17 show pairs of link members of the conveyor belts pertaining to the machine according to Fig. 13, Fig. 14 being a front view, Fig. 15 a top view, Fig. 16 a side view, and Fig. 17 a perspective illustration on a larger scale.
Figure 15:
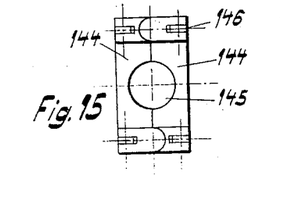
Figure 16:
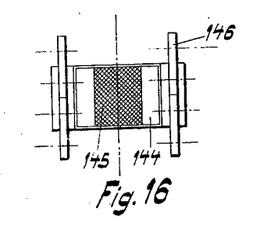
Figure 17:
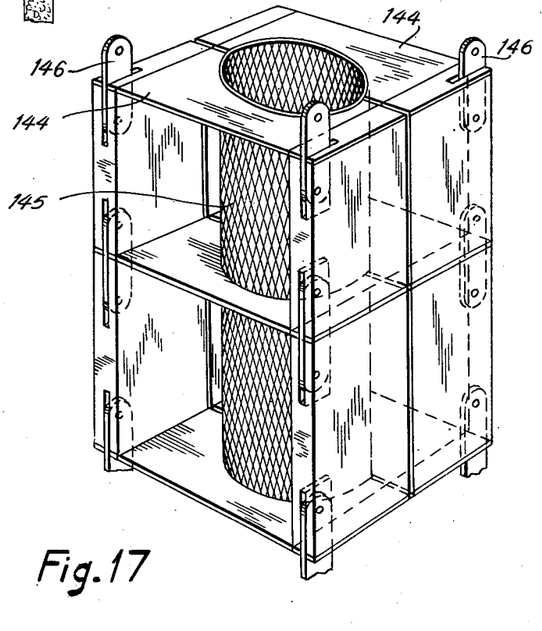

The machine shown in Fig. 13 involves the same principle as the shaping device according to Fig. 2 and the corresponding portion of the machinery according to Fig. 3. The machine according to Fig. 13 has a centrally located pulp-feeding device 100 through which the wet fiber pulp is supplied from a tank (not illustrated in Fig. 13) that may be designed in accordance with those shown in Figs. 1, 11 or 12. The discharge opening of the feed device 100 is located at 101. The feed device has a closure member 102, for instance a faucet or valve for adjusting the amount of pulp being discharged. The shaping device 103 of the machine has two water-permeable conveyor chains 104 and 105, each forming an endless belt. Chain belt 104 passes over guide rollers 137, 138, 125 and 139. Chain belt 105 passes over guide rollers 133, 134, 135 and 136. The drive for the chain belts, schematically shown only for roller 125, comprises a gear and shaft transmission 126. The chain belts 104 and 105 consist of individual sieve members 106 that are articulately joined with each other. The design of the sieve members is apparent from Figs. 14 to 17. Each sieve member has a semi-cylindrical sieve 145 mounted in a casing 144 which has connecting lugs 146 for joining it with the adjacent member. As best apparent from Fig. 17, the sieves 145 of each two members 106 envelop together a cylindrical space.

Reverting to Fig. 13, a drain box 107 is disposed around the mutually adjacent portions of the two chain belts. The upper wall of drain box 107 lies somewhat above the discharge opening 101. A drain pipe 108 serves to remove the water collected in the drain box 107. A suction box 109 immediately below the drain box 107 has a pipe 110 for connection to a negative pressure producer such as a vacuum pump. An additional dewatering device 111 is disposed below the suction box and comprises two suction wheels 112 and 113. Each suction wheel has a number of radial suction channels 114. The stationary bearings 117 and 118 for the respective suction wheels are designed as a frictional distributor valve and have central bores connected with suction pipes 115 and 116 respectively.

Figure 18:
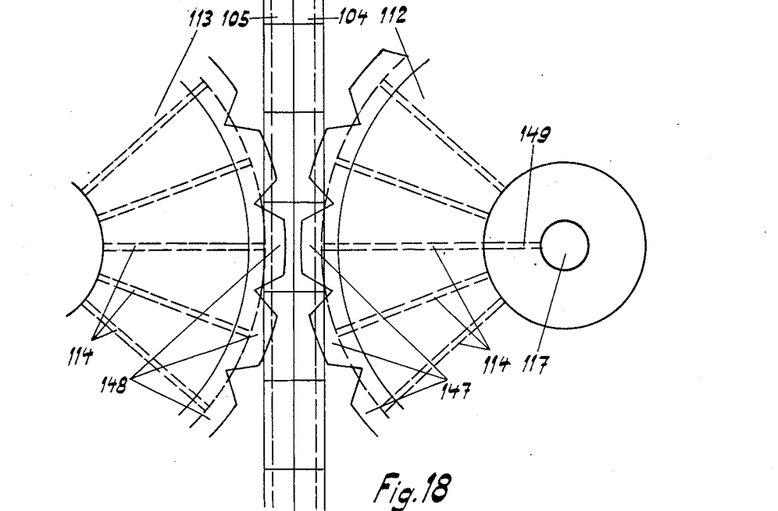
Figs. 18 and 19 show a side view and a sectional top view respectively of part of a dewatering device also pertaining to the machine of Fig. 13.
Figure 19:
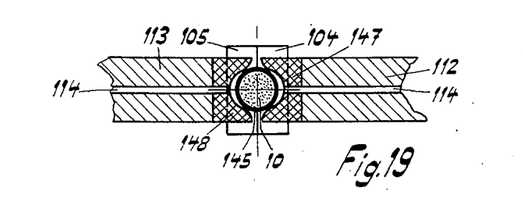

Details of the suction wheels 112, 113 and their coaction with the chain belts 104, 105 are apparent from Figs. 18 and 19. The peripheral tread portion of each suction wheel has rubber teeth 147 or 148 which enter into the sieve casings of the chain belt 104 or 105. The suction wheels 112 and 113 are journalled in bearing brackets 140 and 141 (Fig. 3) whose upper ends are pivotally mounted on the machine frame 142. The respective lower ends of brackets 140 and 141 are connected with each other by a spring 143. Spring 143 forces the suction wheels against the belts 104 and 105 so that the rubber teeth 147 and 148 bear against the semi-cylindrical sieves 145 (see Fig. 19). Whenever, during the travelling of the chain belts, a slot 114 of the suction wheel 112 reaches the horizontal position between the wheel axis and the belt, it communicates temporarily through a slot 149 of the distributor valve 117 with the suction pipe 115 so that the pulp material between the sieves is subjected to suction. The same operation takes place at the suction wheel 113. Both suction wheels are driven by their engagement with the travelling conveyor chains.

At the lower end of the pre-shaping device, the fiber pulp issues from the conveyor chains as a coherent strand 10 and passes upon a conveyor belt 120 driven and guided by rollers 121, 122, 123 and 124. The roller 121 may be driven, for instance, from the same transmission 126 that operates the roller 125. From the conveyor device 119, strand 10 may pass to additional devices as illustrated in Fig. 3, namely first to a molding device and thereafter alternately to drying and smoothing devices and ultimately to a cutting device.

The conveyor chains 104 and 105 are continuously cleaned of any adhering fibers by cleaning devices 127 and 128. These devices have pairs of rotating brushes 129, 130 and 131, 132 respectively. The brushes 129 and 131 run over the conveyor chains in the longitudinal chain direction while the brushes 130 and 132 run in the transverse direction.

The operation of the machine according to Fig. 13, in principle, is similar to the pouring and shaping machinery of Fig. 3. The wet pulp 1 is gravity-fed through the discharge opening 101 of supply device 100 and enters into the cylindrical space formed by the sieve members of the conveyor chains 104, 105. Part of the water content of the pulp drains through the cylindrical sieves 145 into the drain box 107 from which it escapes through pipe 108. As a result, the fiber pulp is densified already within the range of the drain box. The condensed pulp is carried downward by the conveyor chains into the suction box 109 in which the vacuum applied through pipe 110 effects further dewatering of the pulp. A further elimination of water takes place in the additional dewatering device 111 by the action of the suction wheels 112, 113. The spring 143 takes care that the rubber teeth of the suction wheels are always reliably pressed again the sieves 145 of the chain links. As a result, there is always sufficient friction for driving the suction wheels and for providing a good seal between the wheels and the chain links so that as much water as possible passes through the slots 114 rather than running down along the conveyor chains. By virtue of the described dewatering means and the enveloping compression of the pulp by the conveyor chains, the pulp is dewatered and shaped to such an extent that the strand 10 leaving the conveyor chains is coherent and sufficiently shape-retaining to be suitable for further fabrication as described with reference to Fig. 3.

Figure 20:
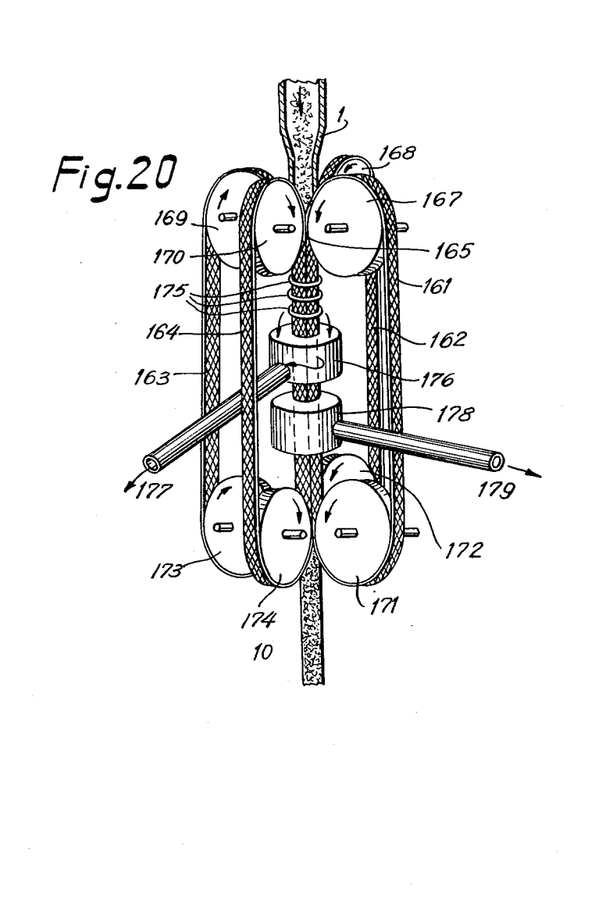
Fig. 20 is a schematic and perspective illustration of a modified pre-shaping device applicable in an embodiment otherwise according to Fig. 3.
Figure 21:
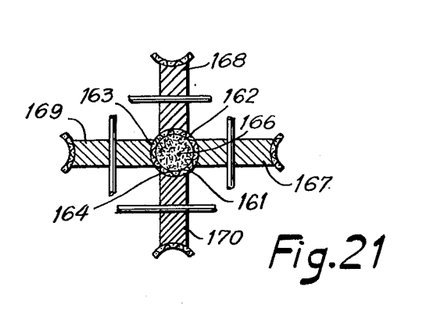
Figs. 21 and 22 show details of the device according to Fig. 20 on a larger scale.
Figure 22:
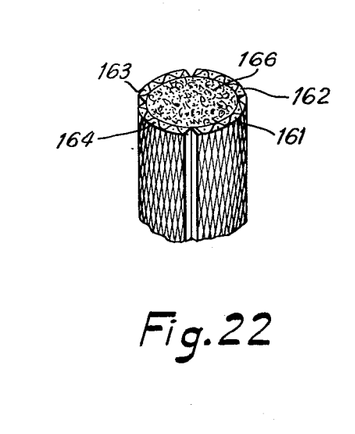

The pre-shaping conveyor device according to Fig. 20 has four water-permeable conveyor belts 161, 162, 163 and 164. Each belt is transversely curved to a quarter circle. The four belts thus form near the discharge opening 165 of the pulp supply device a hollow cylindrical space 166 (see Figs. 21 and 22) which encloses the fiber pulp 1 issuing from the opening 165. The running surfaces of the guide rollers 167 to 174 have a corresponding shape (Fig. 21). The belts may consist, for instance, of wire mesh or of individual articulately joined sieve sheets, or of sieve bands, or perforated and yieldable band material of rubber, nylon or the like. The conveyor members may also consist of individual wire or string-like elements. Depending upon the particular material, it may be necessary to provide auxiliary means, such as the rings 175 in Fig. 20, for holding the conveyor bands together or for securing the hollow cylindrical envelopment of the fiber pulp during the pouring operation. When providing string-like elements as conveying means, similar auxiliary devices for securing the hollow cylindrical envelopment of the pulp may be provided, as are illustrated for instance in Fig. 4. The device of Fig. 20 is equipped with a drain box 176 from which the water drains through a pipe 177. Disposed beneath the drain box 176 is a suction box 178 whose drain pipe 179 is to be connected to a vacuum pump. Near the rollers 171 to 174, the fiber pulp emerges from the pouring device as a coherent strand 10. The operation of the device is otherwise in accordance with that of the above-described embodiments.

Figure 23:
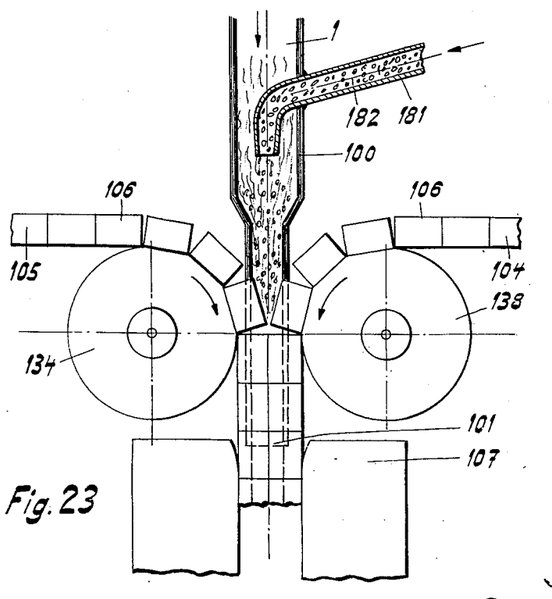
Fig. 23 is a part-sectional view of a pulp-feeding device.

Fig. 23 shows a device, applicable with the above-described embodiments, for loosening the texture of the fiber pulp prior to pouring it into the range of the conveyor of the pre-shaping device. The pre-shaping device may consist of a machine as shown in Fig. 13. In addition to the machine elements already described with reference to Fig. 13, an injection nozzle 181 (Fig. 23) is provided through which a gas, for instance air, is forced into the feeding device 100. This has the effect of reducing the adhesion between the fibers and the water so that the wet pulp assumes a lesser density. Otherwise, the operation of the apparatus is the same as described with reference to Fig. 13. The aeration of the pulp increases the amount of air included in the finished filter product so that it has a greater permeability, i. e. a reduced filtering action. In this manner, the filtering qualities of the product can be controlled or varied as desired.

Figure 24:
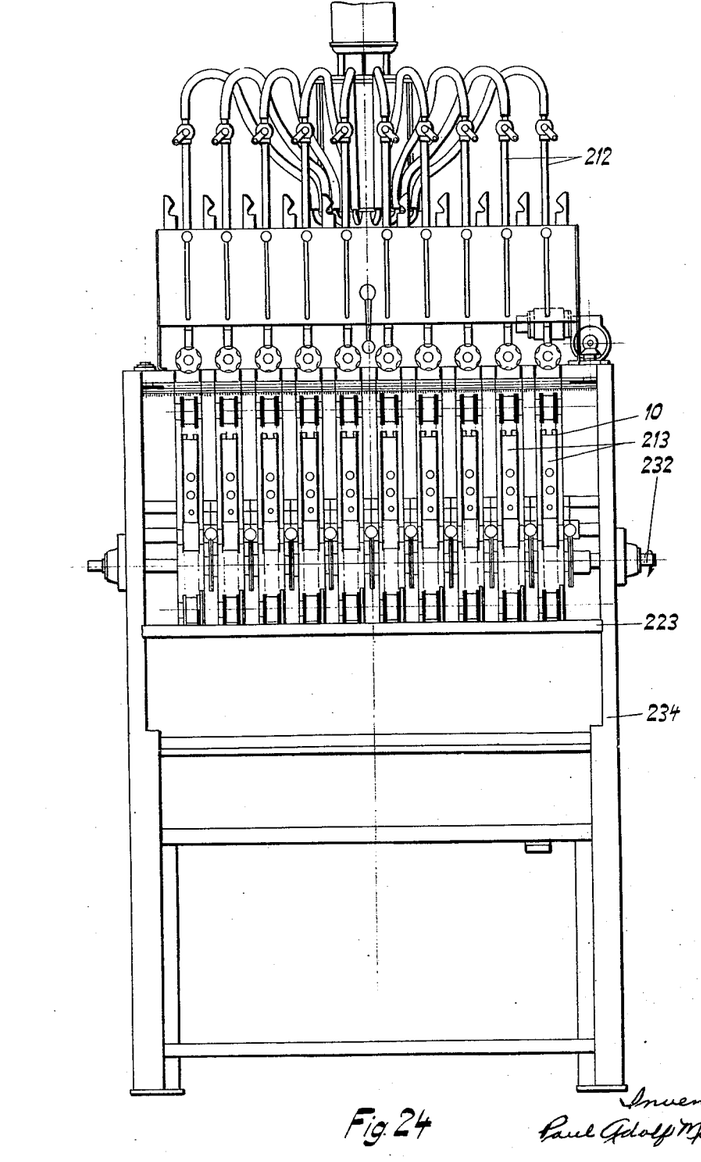
Figs. 24 and 25 are a front view and a side view respectively of a machine according to the invention with an array of individual strand-molding assemblies.
Figure 25:
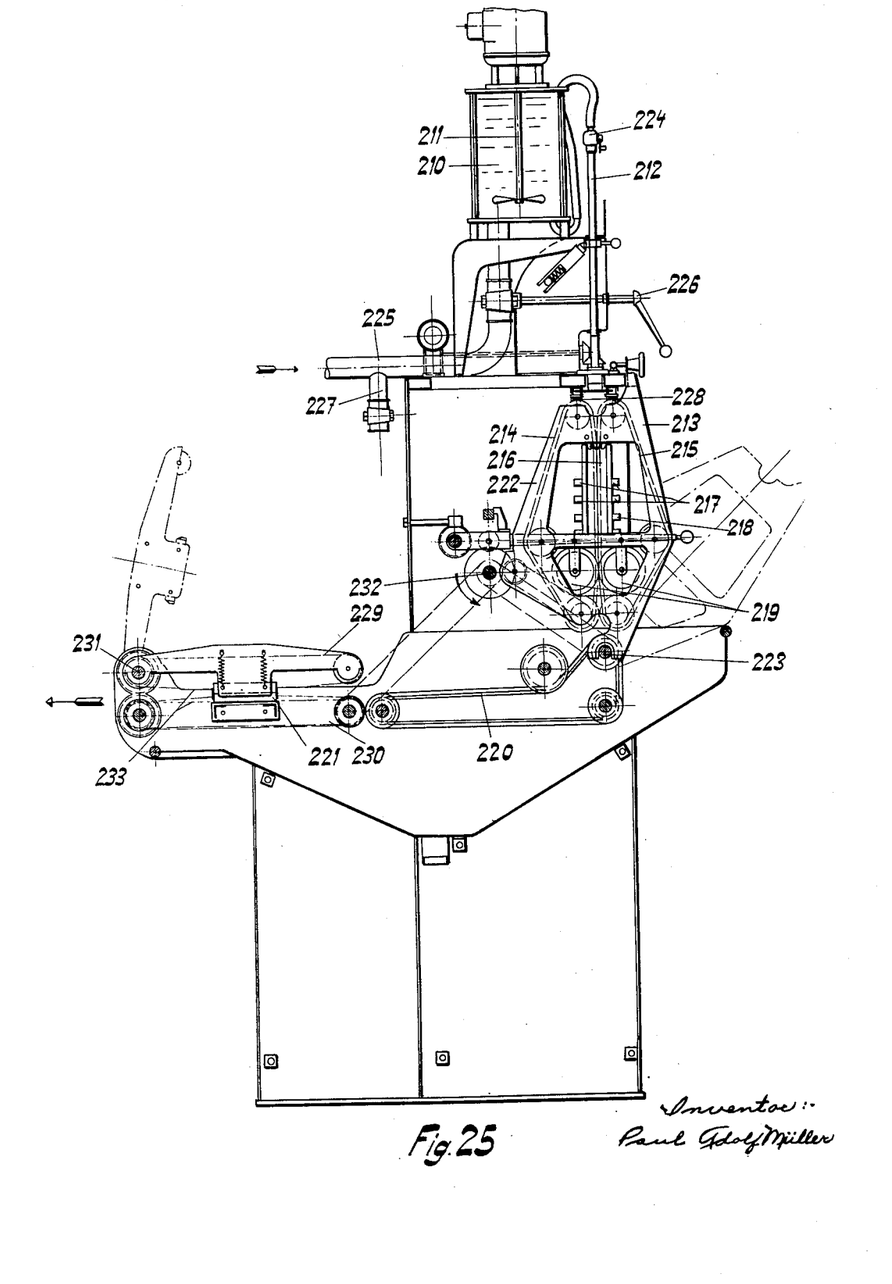

The machine according to the invention shown in Figs. 24 and 25 is designed for mass production. It comprises ten individual sections for the production of filter strands. The individual sections are supplied with watery pulp from a tank 210 equipped with a stirrer 211 and communicating with respective feed pipes 212 that are upwardly withdrawable from the respective sections. Each section has a pre-shaping device 213 with two endless conveyor chains 214, 215 and a dewatering assembly 216 comprising a drain box and a suction box as described previously. The water collected in the drain box issues from the drain pipe 217. The drain pipes 218 of the suction box are to be connected with a vacuum pump (not illustrated). The dewatering assembly further comprises two suction wheels 219 also as described with reference to Fig. 13. A belt conveyor 220 passes the resulting strand to a molding device 221. During the operation of the machine, the conveyor chains 214, 215 are kept clean by band-shaped brushes 228.

Each pre-shaping device 213 with the pertaining conveyor belts and the dewatering assembly is mounted on a frame 222. All ten frames 222 are pivoted on a rod 223 so that each individual frame may be tilted outwardly into the position shown in Fig. 25 by dot-and-dash lines. In this position, the frame and the parts mounted thereon are accessible for cleaning, inspection or repair.

The pulp-feeding device 212 of each assembly has a valve 224 so designed that it must be closed when the feeding device 212 is pulled out of the shaping device. A pipe 225 serves for supplying the wet fiber pulp into the tank 210. Pipe 225 is connected with a pressure vessel (not illustrated) and has a main control valve 226 that permits regulating the flow of pulp into the tank 210. Pipe 225 is further provided with a drain cock 227 to permit emptying the pipe 225 and the tank 210.

The molding device 221 comprises an upper portion 229 and a lower portion 230. The upper portion 229 is tiltable about a shaft 231 as shown in Fig. 25 by dot-and-dash lines. The conveyor means 233 of the molding device consist of individual wire helices as described above with reference to Fig. 4.

All ten sections of the machine are journalled on common shafts, and are driven by a common drive shaft 232. All ten pulp-feeding devices, pre-shaping devices and molding devices are accommodated on a single frame structure 234.

The operation of the machine according to Figs. 24 and 25 is in accordance with that of the machines already described. The wet fiber pulp enters through pipe 225 into the tank 210 where it is kept well mixed by the stirrer 211. From tank 210 the pulp passes through the ten feeding devices 212 into the respective shaping devices where it is dewatered and pre-shaped by the conveyor chains 214, 215 and the suction wheels 219. Thereafter, the pre-molded filter strand in each machine section is carried by the belt conveyor 220 into the molding device 221 where it is further dewatered and molded. The drying and final conditioning of the strand may be effected in devices as described in connection with Fig. 3.

Figure 26:
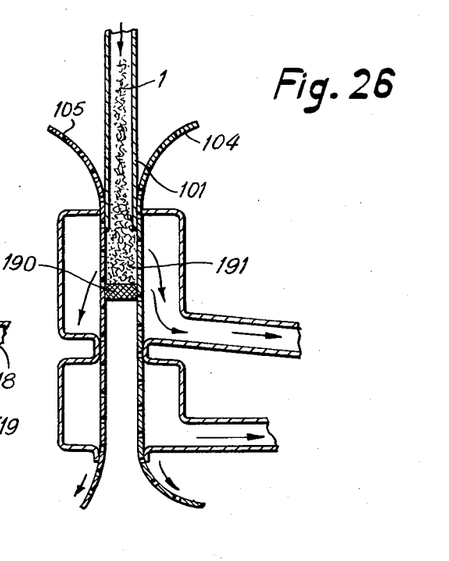
Fig. 26 is explanatory and shows schematically a pulp-supplying device in condition for starting the casting and molding operation.

The method and operation according to the invention may be started in the manner illustrated in the following with reference to the example presented in Fig. 26. Before starting the machinery, for instance before opening the stop valve 102 in Fig. 13, and before setting the conveyor device 103 in operation, an auxiliary stopper 190 is inserted into the conveyor device slightly below the discharge opening 101. The stopper prevents the flow of pulp so that the pulp becomes strongly condensed immediately above the stopper. The mass 191 of fibers thus accumulating above the stopper clogs the supply of pulp. When the conveyor belts or chains 104, 105 start moving, the stopper 190 and the clogged-up accumulation of fibers are taken along. As stopper 190 is moving downward, additional fiber material accumulates and condenses above it. This continues until the auxiliary stopper 190 drops out of the lower end of the conveyor device 103. At that moment, the densified mass of fibers behind the stopper has reached the necessary length and consistency to prevent a free escape of watery pulp from the discharge opening 101 so that the pulp continues to emerge at the bottom of the conveyor device in the form of a coherent and pre-molded strand. When stopping the conveyor device 103, there is always a plug of fiber material located between the conveyor belts so that the auxiliary stopper 190 is not required when resuming the operation of the device.

As previously mentioned, the density of the fiber strand depends upon the pressure of the pulp at the discharge opening of the pulp-feeding device. However, the density is also affected by the travelling speed of the conveyor means, the initial density of the watery pulp 1 and upon the degree of dewatering and compression mainly within the pouring device. Some regulation of the strand density is also obtainable in the molding device (see Fig. 3). The described method and machinery is particularly suitable for the manufacture of filter strands for smoke filter bodies to be used in cigarettes, in cigarette or cigar holders, or in smoking pipes. However, the invention is also applicable for producing filters for other purposes since the method and machinery can be adapted to the type and shape of the desired filter structure.

The fiber material for the fibrous pulp may consist of all kinds of cellulose fibers, particularly wood cellulose fibers. Depending upon the intended use of the fibers, other cellulose fibers, for instance cotton fibers and/or wool fibers, may be admixed. Filter strands produced according to the invention have the outstanding advantage that they are free of longitudinal passages completely traversing the filter body. As a result, the filtering effect is uniform and reliable, for instance, when using the filters as a component of cigarettes or in a smoking pipe. Such filters are further of advantage from the viewpoint of cost and simplicity of manufacture, since each filter consists of a single mass and does not require additional means for holding the filter material together, in contrast to many other known filters, for instance filters in cigarettes composed of foils and requiring an envelope which holds the filter material together and determines its shape.

It will be obvious to those skilled in the art that the invention may be given embodiments and modifications other than those specifically illustrated and described, without departing from the essential features of the invention and within the scope of the claims annexed hereto.

I claim:

1. A machine for producing a filter strand from fibrous pulp, comprising a pulp feed device having a discharge opening for supplying watery fiber pulp, a conveyor adjacent to said discharge opening and having an endless water-permeable belt to receive and convey the pulp from said opening, and a hollow cylindrical strainer traversed by said belt and having its inner surface engaged by said belt to deform said belt to a hollow cylindrical shape.

2. A machine for producing a filter strand from fibrous pulp, comprising a feed device for supplying watery fiber pulp, an endless water-permeable conveyor belt adjacent to said feed device for receiving pulp from said device, a hollow cylindrical strainer traversed by said belt and having its inner surface engaged by said belt to deform said belt to a hollow cylindrical shape, and a vacuum nozzle device surrounding said strainer for draining water from the pulp, whereby the pulp while being conveyed is shaped to a coherent strand and simultaneously dewatered.

3. A machine for producing a filter strand from fibrous pulp, comprising a feed device for supplying watery fiber pulp, a conveyor adjacent to said device for receiving pulp therefrom, said conveyor having two endless chain belts, each of said chain belts having a number of sieve members linked with each other and forming together with an adjacent sieve member of said other belt a cylindrical space enveloping the pulp.

4. In a machine according to claim 3, each of said sieve members comprising a semi-cylindrical sieve, a box structure on which said sieve is mounted, and link means also mounted on said box structure for joining it to the other sieve members of the chain belt.

5. A machine for producing a filter strand from fibrous pulp, comprising a feed device for supplying watery fiber pulp, a conveyor adjacent to said device for receiving pulp therefrom, said conveyor having two water-permeable endless belts extending parallel and juxtaposed to each other along part of their respective paths of travel and forming together a hollow cylindrical space for enveloping the pulp along said parts of travel, and two suction wheels revolvably disposed within said respective paths of travel and peripherally engageable with said respective belts at respectively opposite points of said space, and spring means connected with said wheels for forcing them against said respective belts.

6. In a machine according to claim 5, each of said suction wheels having peripherally distributed teeth of yieldable material for engagement with said respective water-permeable belts and having radial suction ducts communicating with the wheel periphery between said teeth, and each of said wheels having a stationary journal which forms a distributor valve and has a suction passage in registery with the one suction duct that at a time is in communication with said space through one of said belts.

7. A machine for producing a filter strand from fibrous pulp, comprising a pulp feed device having a discharge opening for supplying watery fiber pulp, water-permeable conveyor means extending away from said opening to receive and convey the pulp, said conveyor means having a portion of hollow cylindrical shape enveloping the pulp for preshaping and dewatering the pulp to form a coherent strand, and a molding device having a stationary hollow-cylindrical mold disposed about the path of the strand and peripherally engageable with the strand, said molding device having additional water-permeable conveyor means for passing the strand through said mold.

8. A machine according to claim 7, comprising a suction conduit connected with said mold for further dewatering the strand.

9. In a machine according to claim 7, said mold forming a vacuum nozzle and comprising a perforated hollow-cylindrical nozzle body, a housing enclosing said body and forming a suction chamber together therewith, and a suction conduit connected with said housing and communicating with said chamber.

10. In a machine according to claim 7, said additional conveyor means for passing the strand through said mold comprising a plurality of endless string-shaped members extending substantially parallel to each other through said mold and being peripherally distributed over the inner periphery of said mold.

11. In a machine according to claim 7, said additional conveyor means for passing the strand through said mold comprising a plurality of endless elongated members of elastic material.

12. A machine for producing a filter strand from fibrous pulp, comprising a pulp feed device having a discharge opening for supplying watery fiber pulp, water-permeable conveyor means extending away from said opening to receive and convey the pulp, said conveyor means having a portion of hollow cylindrical shape enveloping the pulp for preshaping and dewatering the pulp to form a coherent strand, and a molding device having a stationary hollow-cylindrical mold disposed about the path of the strand and peripherally engageable with the strand, said molding device having additional water-permeable conveyor means for passing the strand through said mold, and electric high-frequency drying means disposed in the travel direction behind said molding device and having a high-frequency field traversed by the strand.

13. A machine for producing a filter strand from fibrous pulp, comprising a pulp feed device having a discharge opening for supplying watery fiber pulp, water-permeable conveyor means extending away from said opening to receive and convey the pulp, said conveyor means having a portion of hollow cylindrical shape enveloping the pulp for preshaping and dewatering the pulp to form a coherent strand, and a molding device having a stationary hollow-cylindrical mold disposed about the path of the strand and peripherally engageable with the strand, said molding device having additional water-permeable conveyor means for passing the strand through said mold, two drying devices spaced from each other in the strand travel direction behind said molding device, and smoothing means disposed between said two drying devices and engageable with the surface of the strand.

14. A machine for producing a filter strand from fibrous pulp, comprising a pulp feed device having a discharge opening for supplying watery fiber pulp, water-permeable conveyor means extending away from said opening to receive and convey the pulp, said conveyor means having a portion of hollow cylindrical shape enveloping the pulp for preshaping and dewatering the pulp to form a coherent strand, and a molding device having a stationary hollow-cylindrical mold disposed about the path of the strand and peripherally engageable with the strand, said molding device having additional water-permeable conveyor means for passing the strand through said mold, and two electric high-frequency drying devices spaced from each other in the strand travel direction behind said molding device, one of said drying devices having respective electrodes asymmetrical to the path of the strand and having between said electrodes an electric field direction essentially along said path, said other drying device having respective electrodes symmetrical to said path and having an electric field direction transverse to said path.

15. In a machine according to claim 12, said drying means comprising an array of electrodes of different polarities disposed on opposite sides of the strand path and having conjointly a field through the strand in its longitudinal direction, said electrodes being rod-shaped and extending transverse to said path, the electrodes of one polarity being disposed between the electrodes of the other polarity and being spaced therefrom in said longitudinal direction.

16. A machine according to claim 12, comprising a smoothing device disposed in the strand travelling direction behind said drying means and being engageable with the surface of the strand.

17. A machine according to claim 12, comprising a smoothing device disposed in the strand travelling direction behind said drying means and having at least four smoothing rollers having respective curved surfaces engageable with the strand and conjointly enveloping the strand.

18. A machine according to claim 12, comprising a smoothing device disposed in the strand travelling direction behind said drying means and having two pairs of smoothing rollers one disposed behind the other and having respective curved surfaces engageable with the strand and conjointly enveloping the strand, each pair of rollers having parallel roller axes and extending at a right angle to the axes of the other roller pair.

19. In a machine according to claim 18, said respective axes of each pair of smoothing rollers having an adjustable distance from each other.

20. A machine for producing a filter strand from fibrous pulp, comprising a pulp feed device having a discharge opening for supplying watery fiber pulp, water-permeable conveyor means extending away from said opening to receive and convey the pulp, said conveyor means having a portion of hollow cylindrical shape enveloping the pulp for preshaping and dewatering the pulp to form a coherent strand, and a molding device having a stationary hollow-cylindrical mold disposed about the path of the strand and peripherally engageable with the strand, said molding device having additional water-permeable conveyor means for passing the strand through said mold, drying means disposed behind said molding device relative to the travel direction of the strand, and a calibrating device disposed behind said drying means and circumferentially engageable with the strand for calibrating it to final thickness.

21. A machine for producing a filter strand from fibrous pulp, comprising a pulp feed device having a discharge opening for supplying watery fiber pulp and having pressure control means for adjusting the pressure of said pulp at said discharge opening, water-permeable conveyor means extending away from said opening to receive and convey the pulp, said conveyor means having a portion of hollow cylindrical shape enveloping the pulp, whereby the pulp while being conveyed is shaped to a coherent strand and simultaneously dewatered.

22. A machine for producing a filter strand from fibrous pulp, comprising a feed device for supplying watery fiber pulp, a conveyor adjacent to said device for receiving pulp therefrom, said conveyor comprising a plurality of individual endless members consisting essentially of wire mesh and having a curved cross-sectional shape, said members forming together a water-permeable hollow cylindrical structure enveloping the pulp, whereby the pulp while being conveyed is shaped to a coherent strand and simultaneously dewatered.

References Cited in the file of this patent

UNITED STATES PATENTS

| | | |
|---|---|---|
| 1,359,489 | Claussen | Nov. 23, 1920 |
| 1,615,392 | Little | Jan. 25, 1927 |
| 1,615,419 | Walker et al. | Jan. 25, 1927 |
| 1,615,422 | Walker et al. | Jan. 25, 1927 |
| 1,632,398 | Franks | June 14, 1927 |
| 1,707,375 | Upson | Apr. 2, 1929 |
| 2,072,138 | Sherman | Mar. 2, 1937 |
| 2,698,972 | Keller | Jan. 11, 1955 |

FOREIGN PATENTS

| | | |
|---|---|---|
| 321,976 | Germany | June 15, 1920 |